(No Model.)
J. W. MALOY.
IMPLEMENT FOR REDUCING STONE, &c.
No. 409,052. Patented Aug. 13, 1889.
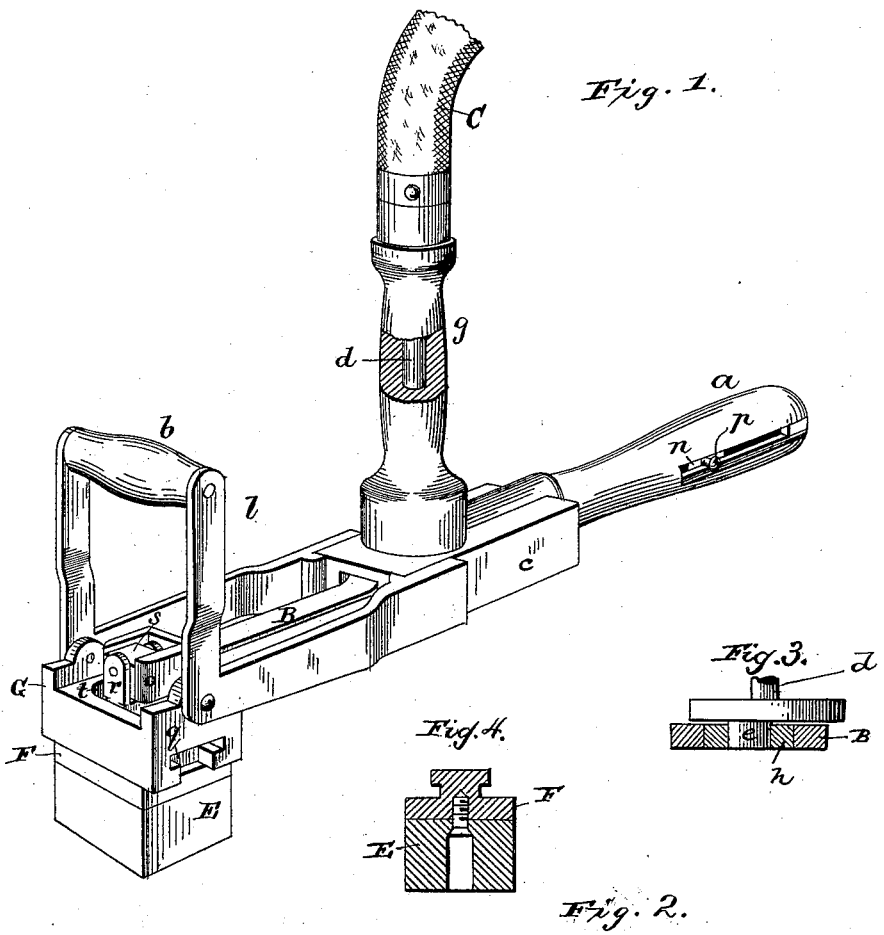
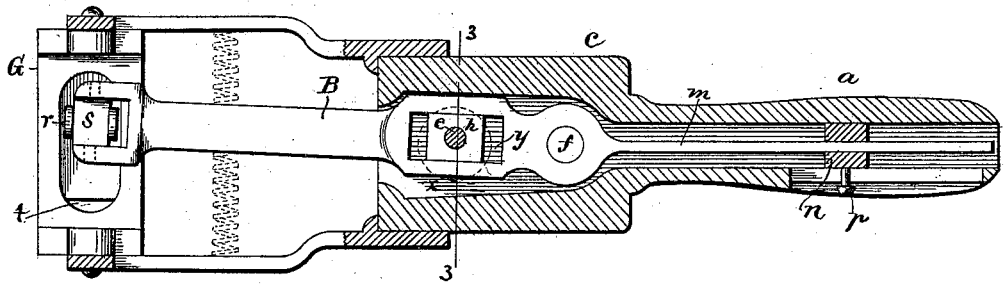
Witnesses.
Chas. R. Burr.
J. J. McCarthy.
Inventor
J. W. Maloy
by
Foster & Freeman
his Attorneys.

UNITED STATES PATENT OFFICE.

JAMES W. MALOY, OF MARIETTA, GEORGIA.

IMPLEMENT FOR REDUCING STONE, &c.

SPECIFICATION forming part of Letters Patent No. 409,052, dated August 13, 1889.

Application filed December 24, 1887. Serial No. 258,905. (No model.)

*To all whom it may concern:*

Be it known that I, JAMES W. MALOY, a citizen of the United States, residing at Marietta, Cobb county, Georgia, have invented certain new and useful Improvements in Implements for Reducing Stone, &c., of which the following is a specification.

My invention relates to that class of reducing-implements in which the reducing action, grinding, or polishing is effected by a reciprocating tool; and my invention consists of an implement having a frame supporting a rapidly-revolving driving-shaft and lever operated thereby and connected to reciprocate a reducing-tool, as fully hereinafter set forth and claimed, and as illustrated in the accompanying drawings, in which—

Figure 1 is a perspective view, in part section, of a stone-reducing implement, illustrating my improvement; and Fig. 2 is a sectional plan thereof. Fig. 3 is an enlarged partial section on the line 3 3, Fig. 2. Fig. 4 is a cross-section of the carriage and the tool carried thereby, showing one means of detachably securing the tool to the carriage.

The frame of the implement is suitably constructed to support the operating parts, and is provided, preferably, with two handles $ab$, the former in the form of a bar constituting a prolongation of the body $c$ of the frame, and the latter a yoke at the end of the frame, so that by grasping the handle $a$ in one hand the implement may be held and steadied at the rear end, while with the other hand the forward end may be swung round and lifted and lowered to manipulate the implement, as circumstances may require.

The body portion $c$ is provided with a hollow stem $g$, within which revolves a driving-spindle $d$, carrying at the lower end an eccentric wrist-pin $e$, which extends into a chamber $x$ in the body covered by a cap-piece open at the forward end, said chamber extending into the handle.

Into the chamber $x$ extends the rear end of an operating-lever B, pivoted to a pin $f$ and having a longitudinal slot $y$, receiving a sliding block $h$, into an opening in which extends the end of the wrist-pin $e$, so that as the spindle $d$ revolves the block will slide back and forth in said slot, and also move from side to side therein, thereby rapidly vibrating the lever. The spindle is preferably driven by a flexible shaft C of any suitable kind to permit the implement to be readily held while operating in any desired position. As the lever is to be vibrated at a very high rate of speed, I employ means to relieve the shock at each change of movement and to aid it in said change. Thus the inner end of the lever is prolonged in the form of a thin blade $m$, suitably tempered or otherwise adapted to act as a spring tending to keep the lever in its mid-position and put under tension as the lever begins its movement in either direction.

To vary the stiffness of the spring, I extend it through a slotted adjustable block $n$, sliding in the handle $a$ and having a button $p$ at one side extending through a slot in the handle $a$, so as to permit of a ready adjustment of the block. As the block is carried toward the fulcrum of the lever, the stiffness of the spring is increased, and it is reduced by moving the bearing in the opposite direction. With the forward end of the lever is connected the operating-tool, which may be of any suitable form, as a rubber block E.

In the construction shown the tool E is secured detachably to a carriage F by one or more screws passing through the tool and into the carriage, the latter consisting of a block having a dovetailed rib $q$, fitting a dovetailed transverse slot in the end of the frame, and an ear $r$, extending from the carriage through a slot $t$ in the frame and being connected by a universal joint $s$ with the outer end of the lever. When the lever vibrates, the carriage and its tool are carried laterally back and forth, so that on the application of the face of the tool to the surface to be operated on the latter will be rapidly reduced.

To facilitate the ready application of the tool to surfaces, edges, &c., at different angles or that are curved, I prefer to pivot the cross-piece G, constituting the end of the frame, to the body of the latter, so that said cross-piece and the carriage and tool supported thereby will swing at an angle to the body of the frame to permit the face of the tool to be flat on the surfaces to be reduced without necessarily changing the angle of the whole implement to said surface.

It will be seen that as the frame of the implement is long and narrow and that as the reciprocating tool can be turned at an angle to the frame it is possible to operate effectually upon faces within narrow openings or in awkward positions not readily accessible to implements of the ordinary character, and that the arrangement of handles described permits the implement when so used to be readily grasped and steadied at either or both ends.

Instead of a restoring-spring made of a flat blade and extended from the rear of the lever, I may use springs at opposite sides of the front end, as shown in dotted lines, Fig. 2. I prefer the blade, however, as it is quicker in its action.

The tool or rubber may be of any desired shape, and it may be used for rapid reduction, as in cutting, or grinding or slow reduction, as in polishing, and while specially adapted for operating on stone, marble, &c., it may obviously be used for operating on various other substances. It will also be evident that any suitable connection between the revolving spindle and the lever may be used.

Without limiting myself to the precise construction and arrangement of parts shown and described, I claim—

1. The combination, with a reducing-tool, of a hand-frame, a pivoted lever carried by said frame, and an operating-spindle also supported by the frame, substantially as and for the purpose described.

2. The combination, with a reducing-tool, of a lever connected therewith, a frame supporting said lever, an operating-spindle, and a spring connected with the lever to restore it normally to a mid-position, substantially as described.

3. The combination of the tool, lever, operating-spindle, a flexible shaft connected with said spindle, and a frame supporting the spindle, lever, and tool and provided with handles, substantially as described.

4. The combination of the frame having a hinged cross-piece, a lever and operating-spindle, a carriage supported by said cross-piece and pivoted to the lever, and a tool connected to said carriage, substantially as described.

5. The combination of the frame, spindle, lever, tool, and spring-blade $m$, extending to the rear from said lever and tending to maintain it in a mid-position, substantially as described.

6. The combination, with the frame and lever having a blade $m$, of a longitudinally-adjustable bearing $n$, substantially as described.

7. The combination of the frame, spindle, flexible shaft, lever, swinging cross-piece G of the frame, and carriage F, sliding longitudinally on said cross-piece and connected by a universal joint with the lever, substantially as described.

In testimony whereof I have signed my name to this specification in the presence of two subscribing witnesses.

JAMES W. MALOY.

Witnesses:
F. L. FREEMAN,
J. S. BARKER.